United States Patent
Huber

[15] 3,687,927
[45] Aug. 29, 1972

[54] ORGOTEIN ISOLATION PROCESS EMPLOYING SINGLE ION EXCHANGE RESIN HAVING BOTH ACIDIC AND BASIC GROUPS

[72] Inventor: Wolfgang Huber, San Francisco, Calif.

[73] Assignee: Diagnostic Data, Inc., Palo Alto, Calif.

[22] Filed: June 7, 1971

[21] Appl. No.: 150,809

Related U.S. Application Data

[63] Continuation-in-part of Ser. No. 657,866, Aug. 2, 1967, abandoned, which is a continuation-in-part of Ser. No. 576,454, Aug. 31, 1966, abandoned.

[52] U.S. Cl. ............260/113, 260/112 R, 260/112 B, 424/177
[51] Int. Cl. .................................................C07g 7/04
[58] Field of Search ..................260/112, 112 B, 113

[56] References Cited

UNITED STATES PATENTS

| 2,461,505 | 2/1949 | Daniel | 424/87 |
| 2,663,668 | 12/1953 | Vrat | 195/66 |
| 2,669,559 | 2/1954 | Reid | 260/112 |
| 3,073,747 | 1/1963 | Reid | 424/92 |

FOREIGN PATENTS OR APPLICATIONS

| 6,614,177 | 4/1967 | Netherlands |
| 1,160,151 | 7/1969 | Great Britain |

OTHER PUBLICATIONS

Neurath, " The Proteins," Vol. III, 1965, pp. 80–82

*Primary Examiner*—Howard E. Schain
*Attorney*—I. William Millen et al.

[57] ABSTRACT

An improved process for reducing the divalent metal ion content to less than $10^{-7}$ M concentration of a solution of orgotein containing greater than $10^{-7}$ M concentration of a divalent metal having an ionic radius from 0.65 to 0.79 A, which comprises reducing the ion content to less than $10^{-7}$ M by passing the buffer solution having an ion content greater than $10^{-7}$ M through an ion exchange resin bed consisting of a single ion exchange resin having both acidic and basic groups which are in sufficiently close proximity so that the resin is partially neutralized internally yet sufficiently separated spatially so that the resin has absorptive attraction for both anions and cations.

14 Claims, 1 Drawing Figure

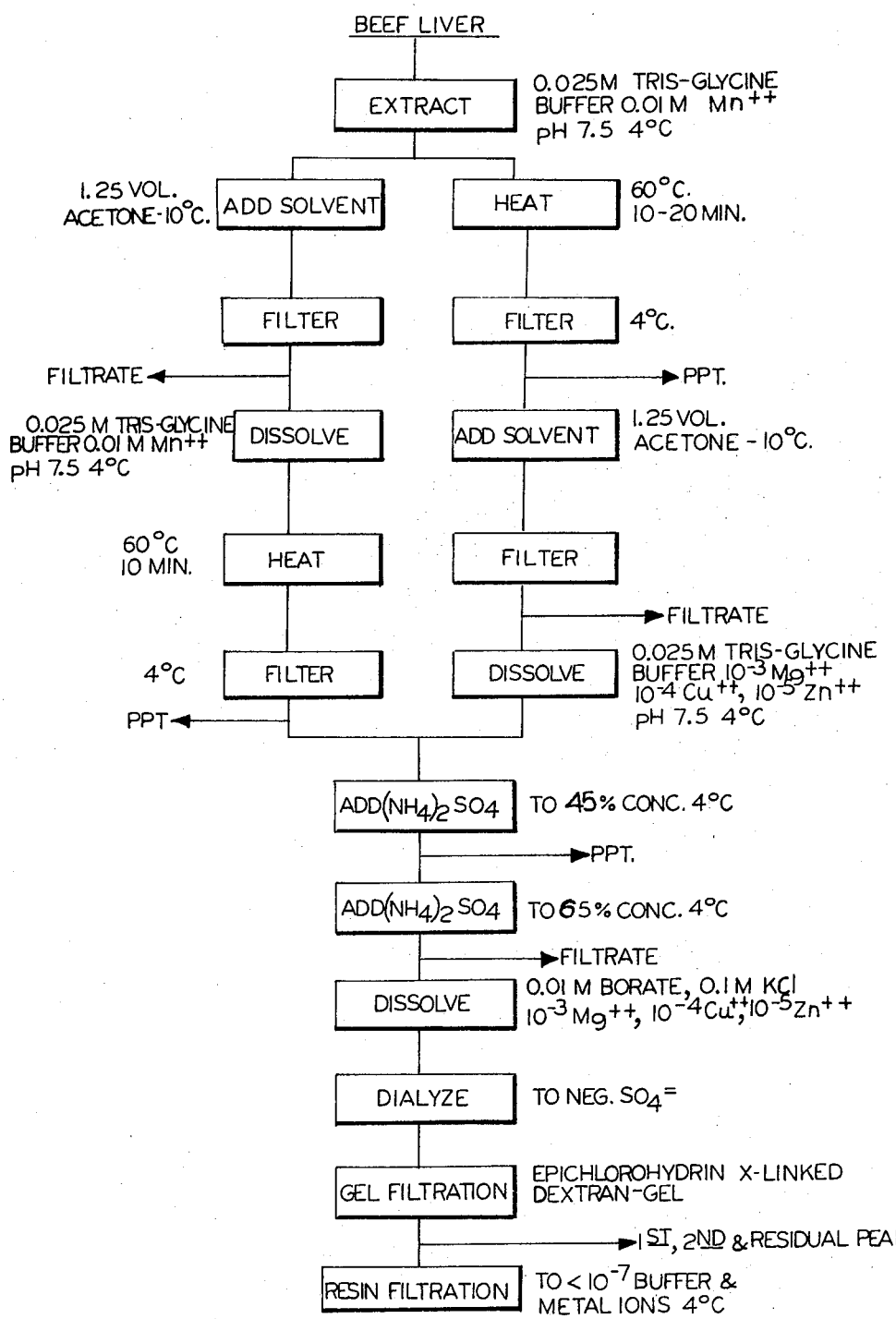

ORGOTEIN ISOLATION PROCESS EMPLOYING SINGLE ION EXCHANGE RESIN HAVING BOTH ACIDIC AND BASIC GROUPS

This application is a continuation-in-part of application, Ser. No. 657,866, filed Aug. 2, 1967 now abandoned, as a continuation-in-part of application, Ser. No. 576,454, filed Aug. 31, 1966, now abandoned in favor of Ser. No. 15,883, filed Mar. 3, 1970.

BACKGROUND OF THE INVENTION

This invention relates to an improved process for the reduction to less than $10^{-7}$ M concentration of an orgotein solution containing greater than $10^{-7}$ M concentration of a divalent metal ion having an ionic radius from 0.65 to 0.79 A.

Orgotein is the name assigned by the U.S. Adapted Names Council to the protein metal chelate having anti-inflammatory and antiviral activity isolated from beef liver and other sources. Details of its properties are disclosed in the U.S. Patent applications of Huber et al. Ser. No. 576,454 and Ser. No. 15,883; and in Belgium Patent No. 687,828.

U.S. applications, Ser. Nos. 576,454 and 15,883 and Belgium Patent No. 687,828 disclose a process for the isolation of orgotein. See also Chem. Abstr. 68, 6193r, April, 1968. In that process the protein precursor of orgotein is separated from the proteinaceous impurities with which it is associated in the natural sources thereof, e.g., beef liver, by a series of fractionations conducted in the presence of one or more divalent metals having an ionic radius from 0.60 to 1.00 A. The pure orgotein protein is obtained in this process as a buffer solution which has a buffer and metal ion content substantially higher than $10^{-7}$ M. The buffer and divalent metal content of the orgotein solution is reduced to less than $10^{-7}$ M concentration in that process by dialysis. This technique is slow and the yield of orgotein substantially free from buffer and non-chelated divalent metal ions is relatively low.

Reid, U.S. Pat. No. 2,669,559 and U.S. Pat. No. 3,073,747 discloses a process for the precipitation of globular proteins by reducing the metal ion content of a solution of mixed proteins with a particular type of ion exchange resins. Because orgotein is a divalent metal chelated protein, it would be expected that removal of metal ions from an orgotein solution would also remove the chelated metals from orgotein, because removal of unchelated divalent metals from orgotein solutions by dialysis denatures a considerable portion of the orgotein. The ion exchange resins employed by Reid are not employed in the process of this invention.

Neurath, "The Proteins," Vol. III (1965) pp. 80–82, describes a 3-layer mixed-bed resin useful for desalting protein solutions. Such a mixed-bed resin column is laborious and difficult to prepare, is operable only under precisely controlled conditions and cannot be regenerated.

It is an object of this invention to provide an improved process for production of orgotein solutions containing less than $10^{-7}$ M concentration of metal ions. Other objects will be apparent to those skilled in the art to which this invention pertains.

SUMMARY OF THE INVENTION

According to this invention, the metal and buffer ion content of a buffer solution of orgotein containing greater than $10^{-7}$ M concentration of a divalent metal having an ionic radius from 0.65 to 0.79 A is reduced to less than $10^{-7}$ M concentration by passing the buffer solution through an ion exchange resin bed consisting of a single ion exchange resin having both acidic and basic groups which are in sufficiently close proximity so that the resin is partially neutralized internally yet sufficiently separated spatially so that the resin has absorptive attraction for both anions and cations. In a preferred aspect, the divalent metal ions dissolved in the buffer solution consists essentially of a mixture of $Mg^{++}$, $Cu^{++}$ and $Zn^{++}$ ions. In another preferred aspect, a buffer solution of orgotein in which the divalent metal ions dissolved therein consist essentially of a mixture of $Mg^{++}$, $Cu^{++}$ and $Zn^{++}$ ions is obtained by dissolving in a buffer solution containing a mixture of these ions a mixture of proteins containing the orgotein protein as a metal chelate whose predominant metal is $Mn^{++}$.

DETAILED DISCUSSION

PREPARATION OF STARTING ORGOTEIN SOLUTION

The starting orgotein solution can be produced from natural sources of the protein precursor of orgotein in the manner described in Ser. No. 576,454, Ser. No. 15,883 and Belgium Patent No. 687,828. The process described therein involves a fractional precipitation of proteins from a buffer solution of a mixture of proteins comprising the desired protein by three separate means, viz., a. adding an organic solvent to the buffer solution so that a portion of the proteins comprising the orgotein protein precipitates therefrom;

b. heating the buffer solution in a manner which selectively denatures a portion of the undesired proteins, thereby precipitating them and leaving the orgotein protein in solution; and c. adding a water-soluble salt, inert to the orgotein protein, to the buffer solution step-wise so that at least a portion of the undesired proteins and the orgotein protein precipitates as separate fractions therefrom.

The orgotein precursor is present in only minute amounts in natural protein fractions. Its presence was not heretofore detected because insufficient care was taken to protect the highly labile natural form of the protein from destruction. Also, conventional isolation techniques were incapable of removing the undesired proteins from the starting mixture without at the same time destroying or removing the desired protein.

A wide variety of natural protein sources contain trace amounts of the precursor natural form of the protein. Such sources include animal organs and tissue, e.g., liver, kidney, testes, pancreas, placenta, intestinal mucosa, thymus, lung, spleen and red blood cells of the rabbit, sheep, lamb, mules, horses, chickens, rats, monkeys, goat, guinea pig, dog, cat, swine, cows, steers, calves, and humans, marine organisms, e.g., whale, dolphin, sea lion, shark, swordfish, mussels, lobsters and oysters, vegetative sources rich in protein, e.g., seeds, wheat germ, whole rye, soya, kidney, lima and jackbeans, and mushrooms; also micro-organisms, e.g., fungi and bacteria, including yeasts, *E. Coli, Cl. Hystolyticum, Cl. Kluyveri*, and *Achrom. Fisheri*. Preferred sources are animal organs and red blood cells (RBC), preferably bovine. The orgotein precursor is labile in its natural form. Therefore, its isolation ought begin as soon as possible after the living organism source is harvested.

The orgotein precursor is often closely associated in the natural protein source with proteins having enzyme activity, e.g., arginase and carbonic anhydrase, etc. However, orgotein itself does not exhibit any generalized enzyme activity. Tests in over 30 different enzyme systems, utilizing a broad range of substrates, have failed to reveal any significant activity when the protein was used in lieu of the enzyme in the respective assay systems. Included were several each of the oxidoreductases, transferases, hydrolases, proteases, lipases and isomerases. Only in the case of catalase, peroxidase and snake venom phosphodiesterase were traces of activity observed, i.e., less than 2 percent of that of the respective known enzymes run in parallel.

Known techniques for isolating such enzyme-containing fractions can be employed for obtaining a starting protein fraction containing enriched amounts of the orgotein precursor if the isolation technique employs a freshly harvested source of protein and otherwise meets the requirements for nondestruction of the desired protein. See R.M. Morton in "Methods in Enzymology," Colowick and Kaplan Editors, Vol. I, pp. 25–51, Academic Press, New York (1955).

To determine whether a mixture of soluble proteins contains protein precursors of orgotein, the orgotein protein is converted into a chelate of a divalent metal having an ionic radius of 0.60 to 1.00 A. and enough protein impurities are removed to permit the characteristic multi-band pattern typical for the orgotein protein in gel electrophoresis at low ionic strength to be detected among the other proteins present. To do so, the mixture of proteins to be assayed for orgotein protein content is dissolved at 0°–5° C. in a buffer at pH between 1 and 4 or 6 and 10, preferably about 7.5, which contains dissolved therein a salt of one or more divalent metals. Any buffer-insoluble proteins are removed, e.g., by filtration or centrifugation. The buffer-soluble proteins are then precipitated therefrom with a water-miscible solvent, e.g., acetone. The buffer soluble portion of the precipitated proteins will reveal on gel electrophoresis on polyacrylamide or agarose at low ionic strength, within its overall pattern the narrow, closely spaced multi-band pattern typical of orgotein. The details for running such electropherograms have been described above.

Thin film argarose electropherograms are particularly useful to follow the enrichment of the orgotein protein in the protein mixture. Sample concentrations of 10–100 mg/ml, run in 0.17 M tris-glycine buffer at pH 8.45, 5 mA and 200–300 V for 30 minutes have proved useful for this purpose. An advantage over disc gel electrophoresis as an analytical tool is their ability to visualize both cathodically and anodically moving proteins as a result of the sample well being near the center of the plate.

Orgotein is isolated from a mixture of proteins comprising the orgotein protein by a multiplicity of fractionation steps employing an aqueous solution at a pH of 1 to 4 or 6 to 11 containing dissolved therein a salt of divalent metal having an ionic radius 0.60 to 1.00 A. This characterizing feature is based upon the discovery that orgotein is unstable at below pH 1 and above pH 11, is partially or completely insoluble at pH between 4 and 6, and is much more stable in the presence of a salt of a divalent metal having such an ionic radius.

As stated above, the orgotein protein is sensitive to pH. Denaturation occurs at pH below 1.0 and above 11. Partial or complete insolubility occurs at pH 4.0 to 6.0 as the isoelectric point is approached from either side. Therefore, solutions of the protein should be maintained at a pH from 1–4 or 6–11, preferably 7.0 – 8.0, to avoid reduced yields by partial denaturation. The degree of solubility or insolubility under any given set of conditions is also dependent on the degree of purity and the concentration of the desired protein.

Preferably the pH of the solution containing the divalent metal ions is non-acidic, e.g., pH 7.0 to 8.5. When the fractionation step involves precipitation of less soluble proteins while retaining the orgotein in solution, the pH is preferably about 8.5. When the orgotein protein is precipitated, the pH is preferably somewhat lower, e.g., about 7.5.

Buffers which can be used include any conventional buffered aqueous solvent solution for proteins which provide the requisite pH, e.g., $NH_4H_2PO_4$ — $(NH_4)_2HPO_4$, tris(hydroxymethyl)-amino-methane, maleic acid—NaOH, citric acid-sodium citrate, acetic acid-sodium acetate, citric acid—$(NH_4)_2HPO_4$, succinic acid—NaOH, sodium acid maleate—NaOH, sodium cacodylate—HCl, boric acid-borax, etc. See J. Gormoni, "Methods in Enzymology," Vol. I, pages 138–146 (1955), especially buffers No. 5–8 and 10–18. Water adjusted to weakly alkaline pH and containing sufficient divalent metal ion can also be used.

As stated above, the desired protein is much more stable, particularly to heat, as a chelate of a divalent metal ($Me^{++}$) having an ionic radius 0.60 to 1.00 A. It rapidly loses its vital compact configuration in the absence of adequate amounts of such chelating metals. Therefore, at least the heat purification step described herein and preferably several or all other isolation steps are conducted employing an aqueous solution containing a salt having an ionic radius of 0.60 to 1.00 A, preferably 0.65 to 0.80 A, more preferably 0.65 to 0.79 A, e.g., $Mg(Ac)_2$, $MgSO_4$, $MgCl_2$, $CaCl_2$, $MnSO_4$, etc. in at least $1 \times 10^{-4}$ M concentration, preferably 0.005 to 0.20 M, e.g., about 0.020 M, when the metal is Mg or Mn. The concentration which should be used is dependent upon the divalent metal used. Magnesium, manganese, calcium and cobalt keep the protein in solution above about 0.2 M or below about 0.02 M concentration of the metal. Zinc and copper bring about precipitation at 0.2 M. Therefore, these should be used at lower concentration than the other metals, e.g., about $5 \times 10^{-4}$ M for copper and $5 \times 10^{-5}$ M for zinc.

In a preferred aspect of this invention the starting buffer solution of orgotein which contains greater than $10^{-7}$ M concentration of divalent metals is obtained by removing the final extraneous protein impurities from the orgotein protein while dissolved in a buffer solution containing as the sole divalent metal ions a mixture of $Mg^{++}$, $Cu^{++}$ and $Zn^{++}$ ions, in concentrations of $10^{-3}$ M, $10^{-4}$ M and $10^{-5}$ M, respectively.

In the process of this invention, which involves the at least partial purification and preferably isolation of the protein while it is in the form of a metal chelate with one or more divalent metals having an ionic radius of 0.60 to 1.00 A, the predominant metal preferably is one having an ionic radius of 0.65 to 0.79 A. If the chelate is desired whose predominant metal is one having a lower or higher ionic radius, e.g., manganese or calcium (ionic radius 0.80 A and 0.99 A, respectively), it can be produced by transchelating a chelate whose predominant metal is one having an ionic radius of 0.65 to 0.79 A.

Transchelation techniques known in the art can be used, if appropriately modified to take into consideration the properties of orgotein, e.g., by dissolving the chelated protein in a buffer solution containing a water soluble salt of a divalent metal having an ionic radius of 0.65 to 0.79 A, with the ratio of metal ion to protein being such as to retain the protein in the selected buffer solution as a metal chelate of such metal. The choice of conditions is limited by the labile character of the protein in the absence of chelating metals and at temperatures about 5° C. and at pH below 1 or above 11 and its low solubility at pH about 4 to 6.

In the transchelation step the protein is converted from one metal chelate into another without at any time irreversibly altering the conformation of the protein in so doing. This can be accomplished by the use of a buffer solution containing an absolute excess of the desired metal ion, calculated on the starting protein chelate. Preferably, and depending upon the metal(s) used, the metal ion is present in a $10^{-5}$ to $2 \times 10^{-1}$ M or greater concentration, but in any case in such absolute concentration that the metal ions of the protein chelate present at the beginning of the transchelation process are at least partially and preferably predominantly exchanged by the metal ions of the buffer solution. For the reasons given above, the exact concentration is dependent on the particular divalent metal present in the aqueous solution, i.e., a concentration should not be used which causes the orgotein protein in precipitate from the solution.

In another preferred aspect of this invention, the orgotein isolation process employs an aqueous solution of the orgotein protein which contains, in the beginning of the fractionation process, $Mn^{++}$ ions and which contains, at the end of the fractionation process, a mixture of $Mg^{++}$, $Cu^{++}$ and $Zn^{++}$ ions. This results in a transchelation of the orgotein protein so that the predominant metal thereof becomes Mg, Cu or Zn.

In addition to certain pH, the orgotein protein is sensitive to heat, the degree of sensitivity depending in part upon its degree of purity. When very impure, e.g., in the form of a lyophilized mixture of all the soluble proteins from a natural source, the orgotein is reasonably stable. As its purity increases during the fractionation process, it becomes increasingly unstable, even in buffer solutions containing a salt of a divalent metal having an ionic radius of 0.60 to 1.00 A. Therefore, the time during which it is maintained at temperatures above 0°–5° C. should be kept to a minimum. Once the orgotein protein is obtained completely pure in its metal chelated form of this invention, stability increases again and less care is required in keeping it in the cold. However, except for the heating step described hereinafter, the orgotein protein and solutions thereof are preferably maintained at below 5° C.

A typical isolation technique employed to obtain the isolated substantially pure protein metal chelate of this invention first removes insoluble materials, using an aqueous solution as a selective solvent for the soluble proteins containing the desired protein. Then materials more soluble than the desired protein are removed employing one or more organic solvent and/or salt precipitation steps in which a fraction of the proteins containing the desired protein is precipitated and the more soluble material is retained in the supernatant. Thereafter, undesired soluble proteins whose structure is held together by weak, electrostatic forces or weak S—S bridges are insolubilized by a brief heating step which selectively denatures such proteins. Preparative electrophoresis, preferably gel electrophoresis, or gel filtration can be used to remove residual undesirable, soluble proteins such as, for instance, albumin, thereby providing an injectable protein product free of impurity-induced side reactions.

To isolate the proteins comprising the desired protein from natural sources, any gross particles of non-proteinaceous and fibrous insoluble proteinaceous material from a freshly harvested source of protein can be removed in a conventional manner. As soon as possible, the freshly harvested material should be chilled and kept chilled except as indicated herein. A temperature below 10° C. is desirable, preferably below 5° C., e.g., as close as practicable to the freezing point of the aqueous solutions used in the isolation steps.

The first step in isolating the desired protein from a protein mixture preferably is the removal of insoluble proteins from the mixture. This can be achieved by intimately mixing the finely divided protein mixture with an aqueous solution, preferably a buffer solution, at about neutrality or weakly alkaline pH.

After separating the insoluble proteins from the buffer solution of the soluble proteins, e.g., by filtration or centrifugation, separation of the undesired soluble proteins and any remaining non-proteins can be accomplished at least in part, by selective precipitation. Much of the undesired highly soluble and less soluble proteins can be removed from the protein mixture by step-wise selective precipitation of the proteins in the mixture from a buffer solution thereof, using organic or inorganic materials soluble in or miscible with, the buffer solution. For example, lipids, nucleic acids, nucleotides and other extraneous materials can be separated by adding sufficient cold acetone or other water miscible organic solvent to the buffer solution of the soluble proteins. Lipids and other acetone soluble impurities remain in solution. Most or all of the proteins, including the orgotein protein, are precipitated. On extraction of the precipitate with appropriate buffer, the orgotein protein is dissolved while many of the other undesired materials remain insoluble.

Any pigmentaceous material in the buffer solution ought also be removed. This can be accomplished by adding a water-soluble amine, preferably heterocyclic, e.g., pyridine, piperidine, or other water-miscible organic solvent or solvent mixture in which the pigmentaceous material is insoluble, to a solution of the proteins in a buffer solution, e.g., before the precipitation of proteins less soluble than the orgotein protein. Removal of the undesired less soluble proteins can follow, if desired, the separation of the precipitated pigmentaceous materials, by adding an inorganic salt or sufficient additional organic solvent to selectively precipitate some proteinaceous material, leaving the desired protein and the more soluble, undesired proteins and any other extraneous very soluble material in the supernatant. For example, the pigment-free buffer solution of the soluble proteins initially can be brought to 40–55 percent of saturation with ammonium sulfate or other organic or inorganic salt or by use of organic solvent at a concentration which reduces the solubility of the protein mixture in the buffer, thereby selectively precipitating much of the undesired less soluble protein, which can be discarded. Organic materials which can be used to selectively precipitate undesired proteins include water miscible polar solvents, e.g., lower aliphatic alcohols, such as ethanol and isopropyl alcohol, and acetone, dioxane and tetrahydrofuran. For example, a mixture of chloroform and ethanol can be used to precipitate the pigmentaceous material and then, after removing that precipitate, more ethanol is added until protein precipitation begins to occur. If desired, the chloroform can first be removed under vacuum. Other organic solvents, e.g., the lower-aliphatic alcohols, acetone, dioxane, tetrahydrofuran, can be used in this step.

The desired protein can be selectively precipitated from the buffer solution, leaving more soluble materials therein, by adding additional salt or solvent thereto in the manner described for the removal of the less soluble proteins.

The selectivity and efficiency of these salt and solvent fractionation precipitations of the desired protein are affected by the pH of the buffer solution, which should be maintained at 1 to 4 or 6 to 12, preferably about 7.5 to 8.5, as well as by the ionic strength and the technique of addition. When organic solvent is used to precipitate the desired protein, exposure time of the protein to the solvent should be as brief as possible and at low temperatures because of the tendency of solvent to denature the protein.

An important step in the fractionation process of this invention, which employs solutions containing a salt of a divalent metal having an ionic radius of 0.60 to 1.00 A, is a heating step in which the proteins more heat labile than orgotein are denatured. This step is preferably conducted after buffer insoluble proteins and non-proteins, pigmentaceous material and organic solvent/water soluble components have been removed. It is important this step takes place with the orgotein protein in the form of a divalent metal chelate. Therefore, the heat treatment ought be conducted in a buffer solution of the protein mixture containing from $1 \times 10^{-5}$ to $2 \times 10^{-1}$ M or more, depending upon the metals used, of the ions of divalent metal having an ionic radius of 0.60 to 1.00 A, preferably 0.65 to 0.80 A.

In the heating step of the process of this invention, a buffer solution of the mixture of proteins containing the orgotein protein is heated at about 50°–75° C. for a period of time from a few seconds up to about 45 minutes, depending on the selected temperature.

The time and temperature employed in the heat treatment are inversely proportional. At this point in the purification process, the desired protein is only briefly stable at temperatures above 75° C. Therefore, unless an instantaneous heating and chilling technique-like flash pasteurization is employed, the mixture should not be heated above 75° C. Heating to temperatures below 50° C. usually is not satisfactory because some of the undesired heat labile proteins are fairly resistant to denaturation at such lower temperatures. At this point in the purification process, the desired protein is stable at 55° C. for at least 15–30 minutes, at 60° C. for about 10–25 minutes, and at 65° C. for about 10–15 minutes, thus permitting the use of conventional heating and cooling techniques. Therefore, heating at about 55° C. for about one hour to about 70° C. for a few seconds, preferably about 60° to 65° C. for about 10 to 20 minutes, is usually employed.

The amount of orgotein lost in the heating step is partially dependent upon the amount of protein impurities which are denatures in this step. Large amounts tend to co-precipitate a portion of the orgotein. Therefore, the heating step is preferably conducted on a protein mixture in which at least some of the protein impurities have been previously removed by other techniques.

In the final purification any significant remaining amounts of extraneous proteins are removed to produce the isolated substantially pure orgotein. Because the remaining proteins other than albumin type are less apt to produce undesirable responses upon injection, their virtually complete removal is less critical but nonetheless much preferred. Remaining extraneous proteins can be removed in a variety of ways, e.g., countercurrent extraction, gel filtration, paper or thin layer chromatography, or selective elution from apatite and other inorganic gels or ion exchange columns either singly or in combination. Gel electrophoresis or resin chromatography using a porous resin which acts as a molecular sieve, e.g., cross-linked dextran, is preferred. Resin chromatography is most preferred for reasons of production economy and because larger amounts of protein can be processed at one time.

An albumin removal step is essential, when the protein source contains albumin, because the other isolation steps usually employed in a process for producing the desired protein product increase rather than decrease the absolute albumin content of the purified protein. For example, the albumin content of the total soluble protein fraction from bovine liver is 7.5 percent; bovine kidney, 8 percent; from porcine kidney, 10 percent; from bovine spleen, oysters and mussels, 2–3 percent. In the fractionation steps described hereinafter, albumin content of the concentrates rises to 22–31 percent. Gel electrophoresis or resin chromatography is effective in reducing the albumin content of these concentrates to below 1 percent.

Thus, concentration without electrophoresis or resin chromatography of a protein source containing significant amounts of albumin causes a build-up of albumin which precludes its safe use as an injectable pharmaceutical agent and prevents it from manifesting useful pharmacological activity. Free-falling curtain electrophoresis is capable of removing much of this albumin. Gel electrophoresis and resin chromatography remove even more. An albumin removal step is not, of course, required when albumin-free starting material, such as red blood cells from many species, is used.

A commercially available electrophoresis unit which can be used for free-falling curtain electrophoresis is the Brinkmann Model FF. The separating chamber in one such unit for instance is 50 centimeters square and 0.5 to 1 mm. in depth. The temperature is maintained as close to 5° C. as possible. The unit permits the collection of up to 48 fractions. In operation, the protein, dissolved in tris-maleate-$Me^{++}$ buffer, pH 7.6, is applied continuously. Currents of about 1,000 volts and 10–20 ma are used. With properly pre-purified protein mixtures, the desired protein chelate will be found in fractions 10–26 which are pooled, dialyzed and lyophilized. The construction and the operating characteristic of this unit limit its capacity to about 500 mg. runs. The isolated protein is obtained in batches of about 100 mgs which are subsequently pooled. Using this method, albumin levels can be lowered to about 5–10 percent. However, levels below 5 percent are not ordinarly achieved.

A more effective purification technique is the gel or "zone" electrophoretic purification described herein which uses a gel supporting medium, e.g., polyacrylamide, agarose, starch, etc. Substantially complete removal of albumin and other extraneous proteins can be achieved by this technique, by virtue of their different speeds of migration.

The preferred preparative gel electrophoresis media is polyacrylamide (5 to 10 percent). Cellulose, cross-linked dextran (Sephadex, Pharmacia, Upsala, Sweden) and starch modifications (ethanolized, etc.), agar, sucroseagar and other agar modifications are satisfactory but have the disadvantage of their gels being more fragile. For a description of the principles of gel or "zone" electrophoresis, see "Gel Electrophoresis," J.F. Fredrick, Editor, Annals N.Y. Academy Sci., 121, 305–650 (1964).

A production model developed for disc gel electrophoresis purification has a 5 to 7 percent polyacrylamide block 32 centimeters long, 10 centimeters wide and one centimeter deep held between jacketed top and bottom plates made from clear plastic. The dimensions of the block are such that cooling is very efficient and the small depth assures rapid temperature equilibrium between center and surfaces. Cooling is provided by a refrigerated circulating system employing ethylene glycol-water. Operation is carried out at 600–1,000 volts and 200–500 ma. These currents together with the very efficient cooling make it possible to handle 1–5 g. quantities of starting protein during a developing process of 2–10 hours. The material is applied to a starting trough as a highly concentrated solution in tris-maleate-$Me^{++}$ or similar buffer at pH 7.4. At appropriate times of development buffer is passed through the gel at right angles to the direction of electrophoretic flow to elute the protein. Location of protein bands, completeness of elution and protein concentration in eluted fractions are determined by spectroscopy at 280 m$\mu$, or by staining of indicator sections.

In gel electrophoresis, beef liver orgotein is found between slow-moving, gamma globulin protein type fractions and the fast moving, albumin-type protein fractions.

Another preferred means for removing albumin and other types of extraneous proteins remaining after the previously described fractionation steps is by chromatography, e.g., using as chromatographing media "-porous" resins which "filter" proteins according to molecular volume, i.e., act as molecular sieves. One such resin is Sephadex (Pharmacia, Upsala, Sweden), a cross-linked dextran resin of defined pore size. The partially purified protein in a buffer-$Me^{++}$ solution, is deposited in highly concentrated form on a column of the resin and then eluted in the manner conventional for chromatographic columns, but using a buffer solution containing a divalent metal of ionic radius of 0.60 to 1.00 A, preferably 0.65 to 0.79 A, e.g., magnesium, or a mixture of two or more of magnesium, copper and zinc, as eluting solvent. Ionic strength variations often facilitate separation and subsequent elution.

IMPROVED PROCESS OF THIS INVENTION

A. Extraneous Ion Removal

In the process of this invention, the metal and buffer ion content of an aqueous buffer solution of orgotein containing greater than $10^{-7}$ M concentration of a divalent metal having an ionic radius from 0.65 to 0.79 A is reduced to less than $10^{-7}$ concentration by passing the buffer solution of orgotein having an ion content greater than $10^{-7}$ M through an ion exchange resin bed consisting of a single ion exchange resin having both acidic and basic groups which are in sufficiently close proximity so that the resin is partially neutralized internally yet sufficiently separated spatially so that the resin has absorptive attraction for both anions and cations.

A protein metal chelate, to be acceptable as a commercial product, must be substantially free from extraneous impurities, proteinaceous or otherwise. Therefore, after the undesired proteins have been separated from the orgotein protein, the buffer ions and excess and extraneous metal ions are removed. In application Ser. No. 576,454, this is accomplished by dialysis. However, in so doing, a great deal of the desired protein is denatured. Because the protein at this stage is quite expensive, having gone through a multi-step purification process, this loss is highly undesirable.

It was found that the extraneous buffer and metal ions could be reduced to a very low level, e.g., $10^{-7}$ molar concentration using a single ion exchange resin having an absorptive attraction for the buffer ions and extraneous metal ions, without concurrent adsorption or denaturation of the orgotein protein.

Preferred of these ion exchange resins are the strong acid-strong base mixed resins, particularly amphoteric structures in which a linear strongly acidic resin is cross-linked to a strongly basic linear resin. Examples of these are the amphoteric resins containing both quaternary ammonium groups, e.g., trimethyl-ammonium hydroxide or dimethylhydroxymethyl-ammonium hydroxide and acidic groups, e.g., carboxy or —$SO_3H$. Commercially available products are Rohm and Haas Company (Philadelphia, Pa.) Gel Type Amberlite Ion Exchange Resins MB-1 and MB-3 (styrene-divinylbenzene copolymer), and Dow Chemical Company (Midland, Michigan) Ion Retardation Resin Retardion AG 11A8, a linear polyacrylic acid ionically bound to a linear quaternary ammonium polymer whose acidic and basic groups are about in stoichiometric balance, produced by polymerizing acrylic acid inside Dowex-1, a quaternary ammonium styrene–DVB resin. These resins operate on the principal of acidic and basic groups being in sufficiently close proximity so that the resin is partially neutralized internally yet sufficiently separated spatially so that the resin retains its absorptive attraction for both anions and cations.

In addition to containing both cationic and anionic groups in about stoichiometric balance, the ion exchange resin should be sufficiently dense so that only the low molecular weight buffer and metal ions can penetrate the interior of the resin particle. Protein interaction with the resin, if any, is limited to the surface of the resin. If sufficiently fine mesh (over 325 mesh) resin particles are used, anionic and cationic areas are physically so closely spaced that permanent absorption of a protein molecule statistically is unlikely.

Preferred of the commercially available resins is Rohm and Haas Resin MB-1, a styrene-divinyl benzene resin containing $-SO_3^-H^+$ and $-N(CH_3)_3^+$ $OH^-$ groups.

Techniques known in the art for deionization of aqueous solutions with such ion exchange resins can be used.

In practice, the proteins from 75 kg of fresh beef liver after solvent, heat and salt fractional precipitation steps, dissolved in a buffer solution containing greater than a $10^{-7}$ M concentration of metal ions can be freed of buffer and metal ions to a concentration of less than $10^{-7}$ M, e.g., $10^{-8}$ M or less, by passing the buffer solution through a column of an ion exchange resin only 40 × 3 inches over a period of 30–60 minutes.

The weight ratio of selected ion exchange resin to orgotein protein ought be at least 10:1 and preferably 100:1 or more. The buffer solution of the orgotein protein ought be passed through the column relatively slowly in order to ensure efficient absorption of the buffer and metal ions by the resin.

To protect the orgotein protein, the filtration through the resin preferably is conducted at 0°–5° C. However, when the solution contains a saccharide, particularly sucrose, galactose or fructose, e.g., from twice the weight of orgotein protein to a 5 percent or higher concentration, the filtration can be conducted at room temperature.

B. Use of Buffer Containing $Mg^{++}$, $Cu^{++}$ and $Zn^{++}$

In the process of applications, Ser. Nos. 576,454 and 15,883, the orgotein protein is purified by removal of the final, residual protein impurities, e.g., albumin and gamma globulin-type proteins, while the orgotein protein is in the form of a metal chelate of one or more divalent metals having an ionic radius from 0.65 to 0.79 as the predominant metal. One aspect of the present process is an improvement thereof which comprises the step of removing the final protein impurities from the orgotein protein while the protein is dissolved in a buffer solution containing a mixture of $Mg^{++}$, $Cu^{++}$ and $Zn^{++}$ ions as substantially the sole divalent metal ions present in the solution. The extraneous ion removal step of this invention can then be conducted using as the starting buffer solution the thus-produced buffer solution of the purified orgotein protein containing the mixture of $Mg^{++}$, $Cu^{++}$ and $Zn^{++}$ ions.

The orgotein protein has a strong affinity for virtually all metals in ionic form, particularly when the total metal content of the orgotein protein is low. Consequently, the orgotein protein can be obtained with widely varying metal content and composition. Although this is not critical to the utility and pharmacological activity of the orgotein protein, so long as the chelated metals consist essentially of those having an ionic radius of from 0.60 to 1.00 A and the orgotein protein is relatively free from other metals, particularly the cell poisons and those having a valence of 3 or more, it is desirable to produce a product of substantially constant analysis, particularly if the product is intended for use as a pharmaceutical product. Also, the efficiency of a gel filtration purification step appears to depend at least partially on the uniformity of metal content of the orgotein protein of the buffer solution. Finally, the pharmacological activity of orgotein appears to be higher with certain combinations of metals in the metal chelate, particularly those in which zinc and/or copper are major metal components along with magnesium.

Thus, the present process, in one of its aspects, is directed to the isolation of orgotein as a mixed metal chelate having magnesium, zinc and copper as major components on a gram atom/mole basis. This is achieved by removing the final protein impurities while the orgotein protein is dissolved in a buffer solution containing a mixture of $Mg^{++}$, $Cu^{++}$ and $Zn^{++}$ ions as substantially the sole divalent metals. In the preferred process, the final protein impurities are removed by gel filtration using a resin which separates proteins according to molecular weight, e.g., Sephadex G-100 or G-75 (Pharmacia, Upsala, Sweden). The partially purified orgotein protein in buffer-$Mg^{++}$, $Cu^{++}$ and $Zn^{++}$ solution, is deposited in highly concentrated form on a column of the resin and then eluted in the manner conventional for chromatographic columns, using as eluting solvent a buffer solution which also contains a mixture of $Mg^{++}$, $Cu^{++}$ and $Zn^{++}$ ions as substantially the only polyvalent metals therein.

The orgotein protein has a remarkable affinity for all metals, particularly the polyvalent ones. Therefore, if the purified orgotein protein is to be obtained as a chelate substantially free from undesired metals and in which magnesium, zinc and copper are the predominant metals, the equipment, chemicals, water and all other materials with which the protein is contacted must be scrupulously free from even trace amounts of other metals in soluble form. Glass equipment can contribute large amounts (proportionately) of silicon in the metal chelate. Plastic tubing, metal equipment, filters, etc., can also be the source of significant amounts of extraneous metals in the purified protein. Washing all equipment with solutions of a chelating agent, e.g., $10^{-3}$ M ortho-phenanthroline or dithizone is sometimes helpful.

The best means of controlling the metal composition of the purified orgotein protein is by conducting the final purification step or steps in a buffer solution containing large molar equiv. amounts, relative to the protein, of magnesium, copper and zinc ions. The concentration of the metal ions which should be employed varies with the three metals. Magnesium keeps the protein in solution above about 0.2 M or below about 0.02 M concentration of the metal. A concentration of about $10^{-3}$ M is preferred. Zinc and copper bring about precipitation at 0.2 M and therefore should be used at lower concentration than the magnesium, e.g., about $5 \times 10^{-4}$ M for copper and $5 \times 10^{-5}$ M for zinc. Higher concentrations can be used to selectively precipitate the desired protein, e.g., in the ammonium sulfate step after precipitation of the less soluble protein impurities.

Following this process the purified orgotein protein is obtained as a metal chelate in which a mixture of $Mg^{++}$, $Cu^{++}$ and $Zn^{++}$ constitute weight-wise the majority and desirably at least 75 percent and more desirably 85 percent or more of the total metal content of the protein. For example, the ash content of the protein metal chelate, which will usually vary from about 0.25 to 0.75 percent and contain a total of about 2 to 4 gram atoms of metals, typically will contain from 0.2 to 2 gram atoms of copper, from 0.7 to 3.0 gram atoms of zinc and from 0.02 to 2 gram atoms of magnesium, for a total of about 1 to 5 gram atoms, usually about 4, with all remaining metals totaling about 0.2 to 1 gram atoms.

Experimental evidence indicates that these metals play a decisive role in preserving the conformational integrity of the protein molecule. They appear to be "locking pins," producing intra- or intermolecular cross-links, which maintain the compactness of the molecule and probably account for its stability, immunity to most proteolytic enzymes and many of its pharmacodynamic functions.

C. Transchelation

In another aspect of the improved process of this invention, the orgotein protein is isolated by a process which comprises extracting the mixture of soluble proteins from its natural source with a buffer solution containing a divalent metal ion to produce a buffer solution containing a mixture of the desired protein and undesired proteins, and then selectively precipitating the desired protein from such a buffer solution by a process which includes the steps of (a) adding solvent to the buffer solution; (b) heating the buffer solution; and (c) adding a water soluble salt to the buffer solution. Such a process is disclosed in applications, Ser. Nos. 576,454 and 15,883. The present process is an improvement thereof which comprises conducting the precipitation in step (c) from buffer containing a mixture of $Mg^{++}$, $Cu^{++}$ and $Zn^{++}$ ions and conducting the precipitation in step (a) from a buffer containing $Mn^{++}$ ions.

It has now been found that a buffer solution containing $Mn^{++}$ as the predominant or sole divalent metal is more efficient than, e.g., a magnesium, copper and/or zinc-containing buffer for separating the protein and non-protein impurities at the initial stages of the above-described multi-step process, e.g., in the steps of separating the buffer-soluble components from the insoluble components, precipitating a portion of the soluble proteins comprising the desired protein from the buffer solution with an organic solvent, and denaturing a portion of the undesired proteins by heating a buffer solution of a mixture of proteins comprising the desired protein. However, a buffer solution containing a mixture of magnesium, copper and zinc ions is more efficient for removing the residual undesired proteins. Moreover, because the most preferred form of the isolated orgotein protein has a mixture of copper, zinc and magnesium as its predominant chelating metals, this preferred chelate is most readily produced if the orgotein protein is purified in the last one or more steps while in a buffer solution containing these metal ions. Therefore, the gel filtration or electrophoresis step and desirably also the salt, e.g., ammonium sulfate, precipitation steps are conducted in such a buffer solution.

In carrying out this aspect of the process of this invention, the procedures are those employed in applications, Ser. Nos. 576,454 and 15,883, except a buffer solution containing the correct amount of the three metals are employed, e.g., about $10^{-3}$ M magnesium, $10^{-4}$ copper and $10^{-5}$ M zinc, in the final purification steps and $Mn^{++}$ in the initial purification steps.

ORGOTEIN

As used herein, "orgotein" refers to the isolated, substantially pure divalent metal chelated protein product the solutions of which are freed of buffer and non-chelated divalent metal ions according to the process of this invention. Orgotein is disclosed and claimed in U.S. Pat. applications, Ser. Nos. 576,454 and 15,883 and Belgium Pat. No. 687,828. Orgotein is the non-proprietary name assigned by the United States Adopted Names Council. The term "orgotein protein" refers to the protein portion of that product and the term "orgotein precursor" refers to the orgotein protein in the form in which it was present in the starting mixture of proteins from which the orgotein was isolated, e.g., as a physical mixture or a complex with other proteins.

Orgotein defines a family of protein congeners having a characteristic combination of physical, chemical and pharmacological properties. Each of these congeners is characterized physically by being the isolated, substantially pure form of a globular, buffer and water-soluble protein having a highly compact native conformation which, although heat labile, is stable to heating for several minutes at 65° C. when dissolved in a buffer solution containing a salt of a divalent metal having an ionic radius of 0.60 to 1.00 A and which on gel electrophoresis gives a characteristic multiple-band pattern. Chemically, each is characterized by containing all or all but one of the essential aminoacids, a small percentage of carbohydrate, no lipids, 0.1 to 1.0 percent metal content provided by one to 5 gram atoms per mole of one or more chelated divalent metals having an ionic radius of 0.60 to 1.00 A, and substantially no chelated monovalent metals or cell poisons in the molecule. Pharmacodynamically, each of the congeners is characterized by being a non-toxic, substantially non-antigenic injectable protein whose pharmacological activity includes anti-inflammatory activity which, like its compact conformation, is related to its chelated divalent metal content. Immunological relatedness of an orgotein congener is sufficient to enable its antibodies prepared in the rabbit or other suitable animal to recognize as an antigen one or more other orgotein congeners and/or for one or more of the antibodies to other orgotein congeners to recognize it as an antigen, as evidenced in gel immunoelectrophoresis and/or gel immunodiffusion. Although some of the physical and chemical properties and the type and degree of pharmacodynamic efficacy of orgotein vary from congener to congener, all orgotein congeners possess the above combination of properties. No other known proteins possess this combination.

The aminoacid composition of orgotein congeners is remarkably consistent irrespective of the source from which it is isolated according to the process of this invention. The close relatedness of orgotein congeners is apparent from the surprisingly small variances in the aminoacid analyses for a protein isolated from such diverse sources as beef liver and chicken red blood cells, as shown in Table Ia below. The relatedness is as close or closer than that of other proteins isolated from a multiplicity of species, e.g., insulin, the cytochromes and the hemoglobins. Table Ib lists other properties of various orgotein congeners isolated from a buffer solution containing a mixture of $Mg^{++}$ ($10^{-3}$ M), $Cu^{++}$ ($10^{-4}$ M) and $Zn^{++}$ ($10^{-5}$ M) ions. Metals content is by emission spectroscopy. Modified atomic absorption technique indicates a copper content of about 2 gram-atoms per mole for each congener.

As can be seen in Table Ia, the orgtein congeners are very similar in aminoacid composition. Their similarity can further be shown by calculating the aminoacid Difference Index (D.I.) of the various congeners, which index gives an indication of the degree of structural relationship between any pair of proteins. To determine the D.I. of one protein relative to another, the absolute difference in the aminoacid content for each of the aminoacids present in the proteins is calculated. The sum of these differences multiplied by 50 is the D.I. of the two proteins. Thus, two proteins of identical aminoacid composition would have a D.I. of 0 H. Metzger et al., Nature, 219, 1166 (1968), report the D.I. for 630 protein pairs. All pairs had a D.I. of at least 9 and all except 4 pairs had a D.I. substantially higher than 9.

The anti-inflammatory activity (Ungar Bioassay) and the aminoacid D.I. of orgotein congeners reveal an interesting structural/biological relationship. The D.I. of the orgotein congeners is linearly related to the values obtained for the various congeners in the Ungar Bioassay at 1.0 mg/kg. Plotting the difference between the Ungar Bioassay Index obtained for the various orgotein congeners and that of the selected orgotein against the D.I. for the same orgotein pairs reveals a direct linear relationship, i.e., the higher the D.I. for the pair of congeners, the greater the relative difference which will be observed in their Ungar Bioassays.

As also shown in Table Ia, orgotein is formed of all or all but one essential aminoacids. The aminoacid residue content does not vary greatly from congener to congener. With most congeners a substantial variation (more than 6 residues) in the number of residues of any aminoacid occurs in no more than 3 of the aminoacids.

The apparent molecular weight of beef liver orgotein as determined by gel filtration using Sephadex G–200 is TABLE Ia.—AMINO ACID COMPOSITION OF ORGOTEIN CONGENERS
(Mole percent)

| Aminoacid | Liver, beef | Red blood cells (RBC) | | | | | |
|---|---|---|---|---|---|---|---|
| | | Beef | Sheep | Horse | Rabbit | Chicken | Human |
| Alanine | 6.4 | 6.3 | 6.2 | 5.9 | 6.0 | 7.3 | 7.1 |
| Arginine | 2.9 | 2.6 | 3.2 | 2.0 | 2.8 | 2.6 | 2.6 |
| Aspartic acid | 10.7 | 11.2 | 11.4 | 10.8 | 10.8 | 11.4 | 11.8 |
| Cystine/2 | 2.5 | 2.0 | 1.8 | 2.0 | 1.7 | 3.1 | |
| Glutamic acid | 7.8 | 7.7 | 7.2 | 10.0 | 8.0 | 8.3 | 8.8 |
| Glycine | 16.4 | 16.3 | 17.2 | 15.9 | 17.1 | 17.7 | 16.1 |
| Histidine | 4.0 | 5.0 | 4.5 | 6.2 | 5.3 | 5.4 | 4.5 |
| Isoleucine | 5.2 | 5.7 | 5.8 | 4.7 | 4.9 | 4.8 | 5.3 |
| Leucine | 6.0 | 5.4 | 5.5 | 5.9 | 6.9 | 4.7 | 6.4 |
| Lysine | 6.6 | 6.6 | 8.1 | 8.8 | 6.7 | 6.5 | 7.2 |
| Methionine | 1.2 | 0.8 | 0.6 | 1.9 | 0.9 | 1.0 | |
| Phenylalanine | 2.8 | 2.5 | 2.2 | 2.9 | 2.8 | 2.6 | 2.5 |
| Proline | 4.0 | 4.1 | 4.8 | 3.7 | 4.2 | 4.1 | 3.7 |
| Serine | 5.4 | 5.3 | 4.7 | 4.8 | 5.7 | 4.6 | 7.0 |
| Threonine | 7.8 | 7.7 | 6.2 | 5.2 | 6.6 | 5.8 | 5.5 |
| Tryptophan [1] | 0.3 | 0.2 | 0.3 | 0.3 | Nil | 0.3 | |
| Tyrosine | 0.6 | 0.7 | 0.6 | 0.3 | 0.2 | 0.7 | |
| Valine | 9.7 | 10.0 | 9.1 | 8.9 | 9.8 | 9.4 | 9.6 |
| Total | 100.3 | 100.1 | 99.4 | 100.2 | 100.4 | 100.3 | |

[1] Determined spectrophotometrically according to Edelhoch, H., Biochem., 6, 1948 (1967).

TABLE Ib.—PHYSICO-CHEMICAL CONSTANTS OF ORGOTEIN CONGENERS

| | Bovine | | Horse RBC | Sheep RBC | Rabbit RBC | Chicken RBC |
|---|---|---|---|---|---|---|
| | Liver | RBC | | | | |
| Isoionic point | 5.18 | 5.42 | 5.60 | 5.71 | 5.29 | 5.28 |
| A1%280 glycine buffer, pH 8.5 | 2.3 | 2.2 | 2.3 | 2.5 | 1.9 | 2.9 |
| Lipids | Nil | Nil | Nil | | | |
| Carbohydrates [1] | 0.59 | 0.88 | 0.57 | 0.62 | 0.99 | |
| Immune (Ag/Ab ratios) [2] | 1:400 | 1:400 | 1:16 | 1:200 | 1:1 | 1:1 |
| Metals (GAPM): [3] | | | | | | |
| Copper | 1.14 | 1.07 | 0.94 | 0.91 | 1.33 | 1.18 |
| Magnesium | 0.44 | 0.47 | 0.32 | 0.30 | Nil | 0.22 |
| Zinc | 2.08 | 1.86 | 1.48 | 1.97 | 2.19 | 2.28 |
| Calcium | 0.03 | 0.05 | 0.04 | 0.13 | 0.07 | 0.07 |
| Iron | 0.02 | 0.02 | Nil | 0.02 | 0.07 | 0.04 |
| Manganese | 0.03 | Nil | 0.01 | Nil | Nil | 0.02 |
| Silicon | 0.15 | 0.37 | 0.08 | 0.34 | 0.37 | 0.31 |
| Others | Nil | Nil | Nil | Nil | Nil | Nil |

[1] Modified orcinol procedure, expressed as percent glucose.
[2] Anti-bovine RBC Rabbit DEAE-purified γ-globulin.
[3] Emission spectroscopy.

about 34,000 whereas orgotein isolated from beef red blood cells (RBC) was found to have an apparent molecular weight about 1-½ percent higher (34,500). By gel filtration, the apparent molecular weight of horse RBC orgotein is 33,500; sheep RBC, 32,000; rabbit RBC, 34,000. All values are well within the limits of error for this method. Molecular weights calculated directly by aminoacid analysis also indicates most congeners are quite close to beef liver orgotein in molecular weights.

Original molecular weight determinations established the molecular weight of beef liver orgotein at about 32,500. Subsequent studies indicated a lower figure but exhaustive studies have established that beef liver orgotein has a total molecular weight of about 34,000 (± 4 percent). This molecular weight is based on the average of the values obtained by osmometry, sucrose density gradient, aminoacid profile and gel filtration on a Sephadex G-200 (Pharmacia, Inc.) column 90 × 2.5 cm, eluted with saline and phosphate buffer (pH 7.4) using ribonuclease, chymotrypsin, albumin and gamma globulin as standards. Based on this molecular weight and about a 0.3% ash content, the best values for the protein chelate are a total of about 324 aminoacid residues and about 2–5 gram atoms of metals per molecule.

In the ultra-centrifuge, orgotein in normal saline moves as a uniform, sharp band, with a sedimentation coefficient (beef liver orgotein) of about 3.32 ± 0.05 Svedberg Units.

Beef liver orgotein has an isoelectric point at about pH 5.1 ± 0.02, and an isoionic point at 5.2 ± 0.1. The isoionic point of other orgotein congeners varies somewhat, e.g., from about 5.0 to 5.4. The isoelectric point was determined by isoelectric focussing. The isoionic point was determined according to J. Riddiford et al., Biochem. 239, 1079 (1964). The protein was thoroughly dialyzed to free it completely from all electrolytes and then lyophilized. 25.8 mg of the lyophilized product were dissolved in 5 ml deionized water, placed in a cell maintained at 25° C. under a nitrogen atmosphere and allowed to come to a stable pH (about 40 to 60 minutes).

The presence of a carbohydrate in the protein product was first detected by disc gel electrophoresis, using the Schiff test (W.F. McGuckin and B.F. McKenzie, Clin. Chem. 4, No. 6, Dec. 1965) on acrylamide and cellulose acetate electropherograms of orgotein. Tests with typical sugar reagents after acid hydrolysis indicate the presence in beef liver orgotein of about 0.5–1 percent carbohydrate, expressed as commonly is done, in terms of glucose. The carbohydrate appears to be covalently bonded to the protein. The carbohydrate, however, is probably a pentose, methylpentose and/or glucuronic acid rather than a hexose as evidenced by known colorimetric reactions (Z. Dische, Methods in Carbohydrate Chemistry, 1, 486, Academic Press, N.Y. (1962)). Heptoses, 2-deoxypentoses, hexosamines and sialic acid also could not be detected. A typical elemental analysis of beef liver orgotein is C, 46.82; H, 6.41; N, 16.13; S, 1.10; P, nil; Ash, <1 percent.

Gas chromotography and electrophoresis tests establish that orgotein is not a lipoprotein. It contains less than 0.01 percent lipid phosphorous, less than 0.1 percent cholesterol, less than 0.05 percent galactolipid and no detectable water-soluble glycolipids.

Native orgotein has numerous titrable $\epsilon$-amino groups but few titrable —SH and —OH (tyrosyl) groups. For example, beef liver orgotein and beef RBC orgotein contain one titrable OH (tyrosyl) group (N-acetylimidazole titration), one titrable—SH (p-mercuribenzoate) and 15–16 (beef liver) and 16–17 (beef RBC) $\epsilon$-amino groups (trinitro benzene sulfonic acid titration).

Orgotein has at pH 7 an infrared spectrum curve typical of proteins. Shown below in Table II is the ultraviolet absorption spectra of beef liver orgotein at pH 1.5 in 0.05 N HCl and in 0.05 N HCl plus 0.10 M KCl; at pH 7 in water; at pH 7 in 0.05 M phosphate buffer; and at pH 13 in 0.15 M KCl. Also shown are its U.V. Difference Spectra at pH 1.5/7.0 and pH 7.0/13.0.

TABLE II.—ORGOTEIN ULTRAVIOLET ABSORPTION SPECTRA (Corrected to mg./ml.)
S=ionic strength

| | Absorption | | | | | Difference spectra | |
|---|---|---|---|---|---|---|---|
| | pH 1.5 | | pH 7.0 | | pH 13.0 | | |
| $\lambda$ m$\mu$ | $\gamma$=0.05 | $\gamma$=0.115 | H$_2$O | Buffer $\gamma$=0.05 | $\gamma$=0.15 | $\Delta$ pH 1.5/7.0 | $\Delta$ pH 7.0/13.0 |
| 310 | 0.015 | 0.021 | 0.087 | 0.040 | 0.116 | .019 | .076 |
| 305 | 0.020 | 0.025 | 0.093 | 0.051 | 0.151 | .026 | .100 |
| 300 | 0.030 | 0.038 | 0.113 | 0.064 | 0.198 | .026 | .134 |
| 298 | 0.037 | 0.048 | 0.120 | 0.073 | 0.214 | .025 | .141 |
| 296 | 0.048 | 0.058 | 0.131 | 0.091 | 0.233 | .033 | .142 |
| 294 | 0.067 | 0.075 | 0.157 | 0.111 | 0.253 | .036 | .142 |
| 292 | 0.085 | 0.096 | 0.180 | 0.135 | 0.270 | .039 | .135 |
| 290 | 0.104 | 0.117 | 0.200 | 0.162 | 0.281 | .045 | .119 |
| 289 | 0.109 | 0.125 | 0.213 | 0.173 | 0.272 | .048 | .109 |
| 288 | 0.124 | 0.136 | 0.222 | 0.184 | 0.284 | .048 | .100 |
| 287 | 0.131 | 0.150 | 0.235 | 0.202 | 0.288 | .052 | .086 |
| 286 | 0.144 | 0.163 | 0.248 | 0.220 | 0.293 | .057 | .073 |
| 285 | 0.155 | 0.177 | 0.265 | 0.233 | 0.295 | .056 | .062 |
| 284 | 0.167 | 0.190 | 0.272 | 0.244 | 0.300 | .054 | .054 |
| 283 | 0.178 | 0.200 | 0.281 | 0.255 | 0.303 | .055 | .048 |
| 282 | 0.183 | 0.208 | 0.283 | 0.262 | 0.305 | .054 | .043 |
| 281 | 0.189 | 0.213 | 0.294 | 0.267 | 0.309 | .054 | .042 |
| 280 | 0.191 | 0.217 | 0.298 | 0.273 | 0.310 | .056 | .037 |
| 279 | 0.192 | 0.223 | 0.305 | 0.284 | 0.314 | .061 | .030 |
| 278 | 0.196 | 0.231 | 0.311 | 0.287 | 0.316 | .056 | .029 |
| 277 | 0.200 | 0.236 | 0.318 | 0.293 | 0.316 | .057 | .023 |
| 276 | 0.200 | 0.242 | 0.320 | 0.298 | 0.319 | .056 | .021 |
| 275 | 0.204 | 0.250 | 0.320 | 0.304 | 0.324 | .054 | .020 |
| 270 | 0.198 | 0.267 | 0.337 | 0.318 | 0.365 | .051 | .047 |
| 265 | 0.192 | 0.273 | 0.346 | 0.329 | 0.439 | .056 | .110 |
| 260 | 0.178 | 0.260 | 0.352 | 0.331 | 0.547 | .071 | .216 |
| 255 | 0.159 | 0.229 | 0.344 | 0.318 | 0.742 | .089 | .424 |
| 250 | 0.157 | 0.204 | 0.359 | 0.329 | 0.989 | .125 | .660 |
| 245 | 0.215 | 0.248 | 0.431 | 0.402 | 1.221 | .154 | .819 |
| 240 | 0.442 | 0.471 | 0.700 | 0.689 | 1.474 | .218 | .985 |

As seen in Table II, beef liver orgotein has an uncorrected $A_{280}$ (pH 7, buffer) of 0.273. The corrected value has been determined to be 0.23±0.02 (1 mg/ml.).

In Ser. No. 576,454 the $A_{280}$ ultraviolet absorbance of substantially pure beef liver orgotein was reported as 0.585 (1 mg/ml.). Because the samples of orgotein described therein had a purity of at least 94 percent, this high absorbance was attributed to the tyrosine and tryptophane content of orgotein. Subsequent analytical studies have established that beef liver orgotein has only 3 such groups, which are too few to account for this high absorbance at $A_{280}$.

In the applications of W. Huber Ser. No. 3,492 and Ser. No. 3,538, both filed Jan. 16, 1970, and entitled "Orgotein Purification Process," there are described processes for removing traces of a tenacious extraneous protein in the samples of orgotein produced according to the process of Ser. No. 576,454. It was found that samples of orgotein which are free of this extraneous protein have a substantially lower $A_{280}$, i.e., <0.3. Thus, the high $A_{280}$ absorbance of the orgotein produced according to the process of Ser. No. 576,454 is due to the presence of this tenacious extraneous protein, which is rich in tyrosine and tryptophane residues.

As can also been seen from Table II, the acid and alkaline ultraviolet absorption spectra for orgotein are considerably different from that obtained at pH 7. By plotting these differences, ultraviolet difference spectra can be obtained. These U.V. difference spectra are useful in evaluating the structural aspects related to the aromatic aminoacid moieties of proteins and their environment in the native protein molecule. See Wetlaufer, Adv. Protein Chemistry, 17, 304–383 (1962), Riddiford et al., J.Biol.Chem., 239, 1029 (1964); 240, 168 (1965).

The data obtained for the U.V. difference spectra are in keeping with the data for difference spectra reported by Wetlaufer, ibid, pp. 352-353. Best resolution was obtained at 0.15 ionic strength. The pH 7.0 buffer data was used as the base line because of the difficulty in maintaining a constant pH of unbuffered water. The pronounced peak in U.V. difference absorption (pH 13.0 vs. 1.5 at $\nu$0.15) at 294 m$\mu$ clearly demonstrates the full availability of the one tryptophan residue in the beef liver orgotein molecule under these conditions. The shoulder at 282 m$\mu$ verifies the presence of tyrosine residues whose presence was determined by aminoacid analysis. The presence of the latter residues is best demonstrated by the U.V. difference spectra at pH 1.5 vs. 7.0 at ionic strength 0.15.

In the visible spectrum, samples of orgotein which contain $Cu^{++}$ in the molecule exhibits a peak at 655 m$\mu$, which peak confirms the presence of chelated copper in the molecule.

In gel-electrophoresis, e.g., on polyacrylamide and agarose, orgotein gives a typical pattern showing multiple closely spaced bands at various pH's and at low ionic strength (0.17 M). At higher ionic strengths they tend to contract into a single band. This multi-band electropherogram pattern is characteristic of orgotein congeners but the location of the bands relative to the origin can vary from congener to congener. A typical electropherogram pattern obtained for orgotein from beef liver in thin film, agarose gel is given in the table below. All values are approximate.

Conditions of Electrophoresis
 Agarose gel - Analytical Chemists, Inc.
 Buffer - 0.02 M. Tris: 0.15 M. Glycine: $1.2 \times 10^{-4}$ M EDTA
 0.08% Thymol
 pH 8.45 : conductivity 280 $\mu\nu$ (mhos)
 Power Conditions: 3.5 mA 300 → 370 v

|  | Approximate Band Width mm | Approximate Distance from Origin mm[2]/ | Relative Intensity |
|---|---|---|---|
| Band 1[1]/ | 3.0 | 2.8 | 45.1 |
| Band 2 | 3.2 | 9.5 | 38.2 |
| Band 3 | 2.5 | 15.8 | 16.6 |

[1]/ closest to origin (most cathodic)
[2]/ center of origin through to center of band In view of the apparent uniformity of orgotein by ultracentrifuge analysis, gel filtration and ion-exchange chromatography on DEAE-Sephadex, by amino-acid profile, and by the single C-terminal and single N-terminal aminoacids, etc., the typical multi-band structure obtained in gel electrophoresis may be a band-splitting effect peculiar to buffer effects in the electric field, or an indication of multiple molecular forms and is not likely an indication of the presence of different protein strands associated in the native molecule.

The degree and direction of movement of protein in gel electrophoresis under standardized conditions is determined by the net overall charge pattern present on the outside of the molecule. For orgotein this charge pattern varies from congener to congener. For example, the three bands of beef liver orgotein, beef Red Blood Cells (RBC) orgotein, human RBC orgotein, chicken RBC orgotein, horse RBC orgotein and rabbit RBC orgotein move from the origin toward the anode whereas sheep and pig RBC orgotein move toward the cathode. Human RBC orgotein moves relatively faster than the other anodically moving congeners.

The technique used in polyacrylamide disc gel electrophoresis is based on the work by Ornstein and Davis, Ann. N.Y. Acad. Sci. 121, 321 and 404 (1964), and by Williams and Reisfeld, Nature 195, 281 (1962). The technique used in thin film agarose electrophoresis is based on the work by E. R. Elevitch et al. in Progress in Clinical Pathology, Stefanini, M., Ed., Grune & Stratton, New York, 1965. In both instances several modifications were found to provide better resolution, sharper bands, and more reliable running conditions.

Typical experimental conditions used in polyacrylamide disc gel electrophoresis are as follows:
At pH 9.4, pretreatment was at 2 mA per tube for 1-½ hours at constant current, running gel only. The electrophoresis was conducted at 5 mA per tube for 50 minutes at constant current. Current for 12 tubes was 60 mA at 140 V (beginning) to 320 V (end). Staining was conducted for 16 hours in a solution of 10 percent glacial acetic acid, 20 percent methanol, 70 percent water, containing 15 mg Amido Black per 100 ml. Destaining was conducted at 12.5 mA per tube for 1 hour at constant current. At pH 3.8, there was no pretreatment. Electrophoresis was conducted at 6 mA per tube for 1 hour at constant current. Current for 12 tubes was 72 mA at 100 V (beginning) to 160 V (end). Staining was conducted for 16 hours in solution as above. Destaining was conducted at 12.5 mA per tube for 1 hour at constant current.

Thin gel agarose plates (Analytical Chemists, Inc.,

Palo Alto, California) were used also for electrophoresis. Buffer was 0.02 M Tris, 0.15 M glycine, 0.0003 M EDTA, 0.08 percent thymol, 0.01 percent sodium azide, pH 8.45. Running time was 30 minutes at 4 mA and about 280–340 V. Stain was Amido Black or Coomassie Blue. Sample size was 1λ of a 25 mg/ml protein solution.

For quantitative gel electrophoresis, stained, thin film agarose electropherograms were cut into strips and mounted on clean 1 × 3 inch microscope slides. Individual slides were inserted into the linear transport holder of the Gilford Spectrophotometer, Model 240, and read at 595 mμ, when stained with Amido black. To maximize resolution the smallest aperture (0.05 × 2.3 mm) was used. For orgotein, recorder sensitivity is greatest at an output ratio of 0.25, with a speed of 5.0 cm/min. and a linear transport speed of 1.0 cm/min. The resulting tracings were quantitated by planimetry. All readings were made in duplicate or triplicate and agreed within ±0.5 cm².

Orgotein contains intramolecular —S—S—bridges. Since orgotein and its congeners usually have about 6–10 cysteine groups, it could have as many as 5 intramolecular —S—S—linkages. More likely, less than all of its cysteine groups are available to form such internal bridges. No other covalent cross-links have been found. Its native conformation is maintained in addition by hydrophobic as well as electrostatic forces. The latter include hydrogen bonding as well as the Coulomb forces provided by its bivalent metals.

Orgotein's native conformation in solution is very compact. When the molecule is unfolded with saturated urea or guanidine, it displays cyclical features only in the areas of the molecule where the —S—S— bridges remain intact after the unfolding, unless they have been reduced and alkylated.

Orgotein's C-terminal group can vary from congener to congener, which shows that it does not play a vital role in orgotein's pharmacodynamic properties. For example, in beef liver and beef RBC orgotein the C-terminal group is lysine; in horse RBC orgotein, rabbit RBC orgotein and in sheep RBC orgotein, it is proline; in chicken RBC orgotein, it is glycine.

C-terminal and N-terminal end-group analyses indicate the presence of a single aminoacid both at the C-terminal and at the N-terminal ends of the protein.

Because the aminoacid profile of orgotein varies slightly from congener to congener, its aminoacid sequence also may well vary from congener to congener. Such changes appear not to alter materially either the functional or the pharmacodynamic properties of one orgotein congener when compared to the other members of the family. The determination of the amino-acid sequence, even of a protein of relatively low molecular weight, is a laborious task involving years of research; in addition aminoacid sequence sometimes can vary widely without change of functionality. Thus, to date it has been of little use in the assessment of protein functionality and biological activity. The relatively high molecular weight of orgotein makes identification of a metalloprotein as an orgotein congener by this means impossible for all practical purposes. Of far greater value than aminoacid sequence for identification purposes is the immunological cross-reaction and/or the aminoacid Difference Index of the metalloprotein relative to a known orgotein congener, e.g., beef liver or beef RBC orgotein.

The orgotein molecule in solution is very compact as shown, inter alia, by its pronounced resistance is highly purified state to prolonged heating at elevated temperatures, by the shallow slope of its intrinsic viscosity curve, by the high values for hard-to-exchange amide hydrogen, and by its optical rotatory dispersion values.

Orgotein is at least partially in the form of a metal chelate, i.e., it contains from 1 to 5, preferably 2 to 4, gram atoms per mole of protein (GAPM) of one or more chelated divalent metals having an ionic radius of 0.60 to 1.00 A. Preferably, the predominant metal is one having an ionic radius of 0.65 to 0.79 A, i.e., Co, Cu, Fe, Ge, Mg, Ni and Zn. However, for isolation and processing purposes, the predominant metal can be $Mn^{++}$ (0.80 A). Also, in some cases the predominant metal can be $Ca^{++}$ (0.99 A). Below 2 GAPM, the physiological activity of orgotein drops. Below 1 GAPM, the protein is unstable and readily denatures. Above 4 GAPM, at least a portion of the metal content of the protein appears not to be in chelated form and is not required for the physiological activity of the protein to be manifested at its maximum. The total metal content of most samples is about 0.1 to 1 percent and in the most active samples, it is between 0.25 and 0.75 percent. The degree of pharmacological activity possessed by orgotein appears to be at least partially dependent upon the presence of one or more physiologically essential divalent metal ions in the chelate. Therefore, preferably at least 65 percent, desirably at least 75 percent, and most preferably 85 percent or more of the metal content of the chelate is provided by one or more of Ca, Cu, Fe, Mg and Zn in divalent form, more preferably one or more of Cu, Mg and Zn. For a list of ionic radii of metals, see Hall, "Chemistry and Physics," 44th Ed. pages 3507–8 (1962). In most of such samples, a metal having an ionic radius of 0.65 to 0.79 A, preferably Cu, Mg or Zn is the predominant metal. By "predominant metal" is meant the chelating metal present in highest percentage in the protein chelate.

The monovalent metals, e.g., Na and K, are preferably present in orgotein in at most only trace amounts as part of the metal chelate per se. Orgotein is prepared so that it is virtually free of metals which are cell poisons, e.g., Pb, Cd, Se, etc. The most active chelate samples contain less than 10 percent physiologically non-essential metals, e.g., Al, Si, B. The high Si content of some samples is a tenacious impurity picked up during purification, rather than a chelating metal.

In the application of W. Huber Ser. No. 3,538 filed Jan. 16, 1970, there is disclosed a process for the removal of silicones from samples of orgotein by passing a solution thereof in buffer, e.g., 0.1 M phosphate, pH 6.0, at a concentration of 5 to 20 mg. orgotein/ml through a column of an ion exchange resin having weakly basic or acidic groups, e.g., DEAE-cellulose.

Although most of the metal content of the most active orgotein samples is provided by physiologically essential divalent metals, samples of orgotein often contain undesired other metals. These are often acquired in the isolation process, particularly if the total metal content of the protein is relatively low. This can be avoided by maintaining the protein in a buffer containing one or more physiologically essential divalent metals of a concentration high enough to retard the acquisition of such extraneous metals and/or by contacting the protein only with equipment which is free from such metals.

The low anti-inflammatory activity of the samples of the substantially pure orgotein protein containing less than 1 GAPM divalent metal content shows that too low a chelated metal content of physiologically essential divalent metals (below one GAPM) in the protein has a profoundly adverse effect upon its pharmacodynamic activity.

The acetone precipitate extract, a process intermediate, has at best only a trace of anti-inflammatory activity, although it has been purified substantially. This clearly indicates the activity of the protein is dependent both on the presence of the proper amount of chelated divalent metals and the substantial absence of extraneous proteins.

In Table III there is given the metal content of the orgotein protein at various stages in the fractionation process of this invention. The steps up to the ammonium sulfate fraction step were conducted in buffer solutions containing $Mn^{++}$ as the divalent metal ion. The ammonium sulfate and Sephadex gel filtration steps were conducted in a buffer containing a mixture of $Mg^{++}$, $Cu^{++}$ and $Zn^{++}$ ions.

retained which can be detected on gel electrophoresis, most of which move as a broad weak band, moving substantially slower than the three bands characteristic of orgotein. Trace amounts of other impurities which appear as background between the orgotein bands are sometimes present. These slow-moving protein impurities can also be present in orgotein isolated from other tissue sources. They are rarely, however, present in orgotein isolated from red blood cells.

In the applications of W. Huber Ser. No. 3,492 and Ser. No. 3,538, both filed Jan. 16, 1970, there are disclosed processes for the removal of these extraneous proteins. In one of these processes, a solution of 5 to 20 g/liter of orgotein in a buffer, e.g., monosodium phosphate buffer at pH 6 and at $10^{-3}$ to $10^{-2}$ M concentration, is deposited on a column of an ionic exchange resin having either weakly basic or weakly acidic groups, e.g., DEAE-cellulose; the extraneous proteins are selectively eluted with the same or different buffer at about the same molarity; and the purified orgotein is then eluted with a buffer of higher ionic concentration, e.g., monosodium phosphate buffer at $10^{-1}$ M concentration or the same buffer at $10^{-3}$ to $10^{-2}$ M concentra- TABLE III.—SPECTROGRAPHIC METAL ANALYSIS OF ORGOTEIN PROTEINS FROM BEEF LIVER
(Percent of sample)

| Element | Bovine liver | $Mn^{++}$ extract | Acetone precipitate extract | Supernatant heat treatment | Ethanol precipitate extract | Ammonium sulfate precipitates 0-45% | Ammonium sulfate precipitates 45-65% | Orgotein Twice Sephadex G-75 | Orgotein DEAE-cellulose purified |
|---|---|---|---|---|---|---|---|---|---|
| Copper | 0.007 | 0.038 | 0.019 | 0.014 | 0.010 | 0.068 | 0.084 | 0.119 | 0.146. |
| Magnesium | 0.094 | 0.43 | 0.18 | 0.21 | 0.064 | 0.11 | 0.14 | 0.075 | 0.050. |
| Zinc | Nil | Nil | Nil | Nil | Nil | 0.054 | 0.071 | 0.116 | 0.30. |
| Calcium | 0.036 | 0.020 | 0.011 | 0.016 | 0.005 | 0.002 | 0.005 | 0.004 | 0.006. |
| Iron | 0.080 | 0.12 | 0.068 | 0.014 | 0.016 | 0.037 | 0.008 | 0.003 | 0.006. |
| Manganese | 0.006 | 3.20 | 2.62 | 2.31 | 2.80 | 0.16 | 0.39 | 0.021 | Nil. |
| Aluminum | 0.002 | 0.001 | 0.001 | 0.003 | 0.002 | Nil | 0.006 | Nil | Nil. |
| Antimony | Nil | Nil | Nil | Nil | Nil | Nil | Nil | Nil | Nil. |
| Boron | 0.002 | 0.007 | 0.002 | 0.002 | Nil | Nil | Nil | Nil | Nil. |
| Chromium | Nil | Trace | Trace | Nil | Nil | Nil | Nil | Nil | Nil. |
| Cobalt | Nil | 0.004 | Nil | Nil | Nil | Nil | Nil | Nil | Nil. |
| Lead | 0.002 | 0.024 | 0.036 | 0.028 | 0.009 | 0.003 | 0.004 | Nil | Nil. |
| Lithium | Nil | 0.002 | Nil | Nil | Nil | Nil | Nil | Nil | Nil. |
| Molybdenum | 0.001 | 0.003 | 0.006 | 0.004 | 0.004 | Nil | Nil | Nil | Nil. |
| Nickel | 0.011 | 0.001 | 0.007 | 0.009 | 0.010 | 0.065 | Trace | Nil | Nil. |
| Phosphorous | 1.10 | 0.27 | 0.64 | Nil | Nil | Nil | Nil | Nil | Nil. |
| Potassium | 1.70 | 1.96 | 0.92 | 0.88 | Trace | Nil | Nil | Nil | Nil. |
| Silicon | 0.013 | 0.005 | 0.005 | 0.014 | 0.006 | 0.007 | 0.010 | 0.025 | 0.014. |
| Silver | 0.003 | Trace | Nil | Nil | Nil | Nil | Nil | Nil | Nil. |
| Sodium | 0.430 | 1.42 | 1.35 | 2.64 | 2.33 | Nil | Nil | Nil | Nil. |
| Tin | 0.012 | 0.012 | 0.008 | 0.006 | Trace | Nil | Nil | Nil | Nil. |
| Titanium | 0.001 | 0.002 | 0.002 | 0.003 | 0.005 | 0.008 | 0.002 | Nil | Nil. |

The protein metal chelate product of this invention is characterized by the substantial absence of the other proteins with which the precursor form of the desired protein is associated in its natural state, i.e., it contains less than 10 percent by weight thereof. Such other proteins, particularly albumin, can mask or destroy the physiological activity of the active protein of the product of this invention. As little as 10 percent albumin content can markedly reduce desired pharmacological activity and because of its allergenicity, render it unsafe for human use. The product of this invention preferably contains less than 6 percent and more desirably less than 1.5 percent albumin and other proteinaceous impurities. Albumin content can be determined fluorometrically. This procedure has been described by Rees et al., J. Clin. Path., 7, 336–340 (1954), who employ 8-anilino 1-napthalenesulfonic acid, and Betheil, Anal. Chem., 32, 560–563 (1960), who employs vasoflavine.

The process described herein for the isolation of orgotein from liver and other tissue sources (Examples 1–3) ordinarily produces orgotein of at least 90 percent and usually substantially greater than 95 percent purity. However, traces of extraneous proteins often are tion brought to $10^{-1}$ M ionic strength with other salts, e.g., NaCl.

In the other purification process, the orgotein sample is subjected to a post-purification heat treatment at a higher temperature than was employed in the heating step of the isolation process. This process takes advantage of the greater stability of orgotein when in substantially pure form. The heating is conducted in a buffer solution under substantially the same conditions as employed in the previous heating step, except the heating is conducted at about 65° C. for 1 hour to 75° C. for 20 minutes.

Orgotein is substantially non-toxic. Both acute and long-term chronic toxicity studies failed to reveal any evidence of toxicity attributable to orgotein.

Orgotein appears to be only weakly immunogenic. No precipitating or non-precipitating antibodies in the sera of humans and horses undergoing intermittent clinical treatment with intramuscular injections of bovine orgotein over a period of more than a year were detected. This is very useful clinically because the repeated administration of virtually all known foreign body proteins can result in antibody production at a much faster rate.

Although orgotein is a weak immunogen, it can be made to produce antibodies in sensitive animals, such as rabbit and guinea pig, when introduced therein with strong immunostimulants, such as complete Freund's adjuvant. Rabbits are preferred over guinea pigs because of their greater volume of blood. Even with complete Freund's adjuvant, the production of orgotein antibodies in rabbits requires an extensive immunization regimen, often as long as 2–5 months.

Different immunization schedules were evaluated. In responsive rabbits, the following method produces antibodies reliably. An initial dose of 5–10 mg. orgotein in complete Freund's adjuvant is administered partly into the foot pad and partly into various regions around the neck. This is followed 2 weeks later by 2 mg of orgotein in saline injected into several areas around the neck. The same procedure is repeated at 4 and 6 weeks; thereafter 1 mg orgotein in saline is given every other week for a total of about 2–4 months. Antibody formation is followed by Dean-Webb titration. Once a constant titer has been obtained the animals are bled and the gamma globulin fraction isolated from the serum in purified form by chromatography over DEAE-cellulose, according to H.G. Levy and H.A. Sober, Proc. Soc. Exp. Biol. Med. 103, 250 (1960). This is necessary since the anti-orgotein rabbit sera are generally immunologically quite weak. Standard techniques of immunodiffusion and immunoelectrophoresis are used for evaluation of antigen-antibody interaction. See, e.g., Experimental Immunochemistry, Kabat and Mayer, Charles E. Thomas, Springfield, Ill. 1967.

The gamma globulin fraction containing orgotein antibodies can be used to identify various orgotein congeners by their immunoelectrophoretic patterns. Immunoelectrophoresis of a highly purified orgotein congener against its rabbit antibody produces a sharp continuous precipitin line arching over each of the multiple bands of the thin film agarose electropherogram of the congener. Thus, a congener of orgotein can be identified as such by the production of a visible precipitin line in immunoelectrophoresis or in gel double diffusion in which that congener is run against the rabbit antibody produced by another orgotein congener or when another congener is run against the rabbit antibody produced by that congener. Gel double diffusion is simpler to run but immunoelectrophoresis is more sensitive.

Rabbit antibodies produced by one orgotein congener will "recognize" as an antigen many but not necessarily all other orgotein congeners. The degree of recognition depends on the conformational arrangement of the recognition areas in the congener. For example, as would be expected, the orgotein-rabbit antibodies produced from an orgotein congener has a high degree of recognition for that orgotein congener, as evidenced by the optimal antigen/antibody ratio in immunoelectrophoretic titration. When the orgotein congener is obtained from a source quite diverse from that used to produce the antibody, e.g., chicken RBC orgotein vs. beef liver orgotein-rabbit antibodies, an antigen/antibody ratio of 1:1 may be optimal. If the source of the respective congeners are too diverse, e.g., beef liver vs. wheat germ, the antibodies produced from one of the congeners will be unable to recognize the other congener as an antigen, due to the wide species disparity.

If the metalloprotein believed to be an orgotein congener fails to give a precipitin line on immunoelectrophoresis against orgotein-rabbit antibodies, this metalloprotein can be used to produce rabbit antibodies in the manner described above. Immunoelectrophoresis of these antibodies against known orgotein congeners almost invariably will result in a "recognition" by the antibodies of one or more of the other orgotein congeners and the production of the characteristic precipitin line.

Thus, although immunological evaluation of a metaloprotein is an indirect, i.e., confirmatory, basis for determining whether the metallo-protein is an orgotein congener, it is conclusive proof if there is recognition by the antibodies produced by an orgotein congener of the metallo-protein and/or if antibodies produced by the metalloprotein recognize an orgotein congener. Since bovine liver orgotein and bovine RBC orgotein antibodies produce a precipitin line in immunoelectrophoresis against many other orgotein congeners, and since those orgotein congeners not recognized by those rabbit antibodies either are recognized by one or more of the antibodies produced by other orgotein congeners or will produce anti-bodies which will recognize one or more other antibodies, immunoelectro-phoresis and gel double diffusion are important parameters to establish whether an unknown metalloprotein is an orgotein congener. Obviously, if the metalloprotein has the combination of physical, chemical and pharmacodynamic properties common to the orgotein congeners examined thus far, the evidence is incontrovertible. However, without examining a metalloprotein for this combination of properties, immunological evaluation alone will provide strong evidence that the metalloprotein is an orgotein congener if it is recognized as an antigen by orgotein antibodies or its antibodies recognize as an antigen an orgotein congener.

The following examples are illustrative of the process of this invention and the products thus-obtained, but are not to be construed as limiting.

PREPARATION 1

All operations, unless otherwise indicated, are carried out in a cold room (2°–5° C.).

a. Removal of Insoluble Material

Finely macerated fresh beef liver is mixed with cold 0.025 M trisglycine buffer containing 0.01 M $Mn^{++}$ at pH 7.5 (two liters per kg of liver). Adjust pH to 7.5 if necessary. Thereafter, if the liver is fatty, 50 ml of toluene per kg of liver are added. The mixture is stirred 4–6 hours. The resulting suspension is centrifuged at 20,000 G for 10–20 minutes or pressed through plastic gauze and the insolubles discarded.

b. Removal of More Soluble Material

To the aqueous filtrate obtained in the preceding step is added rapidly and with thorough agitation 1.25 volumes of cold acetone (−10° C.) through a glass tube extending well below the surface of the mixture. The ensuing precipitate is immediately collected by centrifuging, e.g., for 10 minutes at 20,000 G. Completeness of precipitation is checked by adding an additional 0.25 to 0.50 volumes of acetone to the filtrate. Any additional precipitate is also collected. The precipitated proteins are immediately suspended with about 25 percent (V/V) of 0.025 M trisglycine buffer containing 0.01 M $Mn^{++}$ at pH 7.5, calculated on the volume of the filtrate before addition of the acetone. The mixture is stirred in the cold room for several hours. The insolubles are removed by centrifuging and the clear supernatant is adjusted to achieve an about 10 percent protein concentration. Protein concentration can be determined by Biuret analysis or $A_{280}$ absorption as described herein.

c. Heat Labile Protein Removal

The thus-obtained buffer solution is heated rapidly to 60° C. with stirring in a stainless steel kettle and maintained at 60° C. for 10 minutes. Thereafter, the mixture is cooled to 5° C. as rapidly as possible and the bulky precipitate is filtered in the cold room by slow suction over a broad filter surface or centrifuged at 12,000 to 16,000 G for 10 minutes. The precipitate is re-extracted, using small amounts of cold buffer, and the clear supernatants combined. The precipitate is discarded.

d. Removal of Less Soluble Material and Transchelation

The solution from the heat treatment step is concentrated, if necessary, to a protein concentration of at least 8 percent, e.g., using an ion selective membrane (Diaflo Membrane, Amicon Corp., Cambridge, Mass.) to remove excess buffer. The protein solution is mixed slowly and with stirring with cold saturated ammonium sulfate solution containing $10^{-3}$ M $Mg^{++}$, $10^{-4}$ M $Cu^{++}$ and $10^{-5}$ M $Zn^{++}$ to a 45 percent $(NH_4)_2SO_4$ concentration. Stirring is continued for another 15 minutes and the resulting precipitate is removed by centrifuging at 20,000 G for thirty minutes at 0° C. and discarded. To the filtrate is added an additional amount of the saturated ammonium sulfate solution to bring the protein solution to 65 percent $(NH_4)_2SO_4$ concentration. The resulting precipitate contains the orgotein protein and is collected by centrifugation or filtration. The final supernatant is discarded.

e. Gel Filtration

The final precipitate from the $(NH_4)_2SO_4$ step is dissolved in 0.025 M tris-HCl or tris-glycine or 0.01 M phosphate or borate buffer, containing $10^{-3}$ M $Mg^{++}$, $10^{-4}$ M $Cu^{++}$ and $10^{-5}$ M $Zn^{++}$, at pH 7.8 to a concentration as close to 10 percent (w/v) as possible and dialyzed against cold buffer until negative to sulfate ion. The dialyzed solution, after clarification by centrifugation, if necessary, is passed through a Millipore filter. The filtrate is applied directly to the head of chroma-tography columns (3 × 18 in.) filled with Sephadex G-100 or G-75 (epichlorohydrin cross-linked dextran resin, Pharmacia, Sweden). The Sephadex has been swelled, defined and washed by standard techniques described in literature of the manufacturer. The packed columns are equilibrated with the above-described buffer and adjusted to a flow rate of about 20 ml. per hour. The addition of 5–10 percent dextrose or sucrose to the solution improves uniformity of adsorption which facilitates subsequent resolution.

After application to the column, the sample is permitted to equilibrate within the first 3 cm of the resin bed for approximately 30–45 minutes, at which time fractionation is started, the column being developed with additional buffer solution. Individual fractions of 10 ml. are collected. The emergence of peaks is determined by measuring the protein concentration by the absorbance at 280 millimicron.

Two peaks emerge from the column prior to the emergence of the orgotein protein. They represent albumin and other undesirable protein impurities of similar or larger molecular volume. Fractions representing these peaks are discarded. The orgotein protein generally emerges in the range of 130–170 ml. of total eluate. These fractions are combined for further processing. Residual, lower molecular weight protein impurities emerge from the column on further elution, particularly on increasing the ionic strength of the buffer. They are removed to clear the column for a subsequent run.

PREPARATION 2

The procedure of Preparation 1 is followed, except the filtrate from Step (a), instead of being diluted with acetone, is first heated for 15–20 minutes at 60° C., then rapidly cooled to 5° C. The resulting precipitate is removed by filtration or centrifugation and discarded. The filtrate is then treated with acetone as in Step (b). Step (c) is omitted. The precipitate obtained from the acetone treatment is dissolved to a concentration of at least 8 percent in 0.025 M tris-glycine buffer containing $10^{-3}$ M $Mg^{++}$, $10^{-4}$ M $Cu^{++}$ and $10^{-5}$ M $Zn^{++}$ at pH 7.5 and then treated as in Steps (d) and (e).

EXAMPLE 1. BUFFER AND EXCESS $Me^{++}$ ION REMOVAL

The combined fractions from Step (e) of Preparation 1 containing the orgotein protein are filtered through a column of mixed bed resin Amberlite MB-1 Monobed gel-type Ion Exchange Resin, (Rohm & Haas), a styrene-divinyl benzene strongly acidic ($-SO_3^-H^+$) strongly basic ($-\overset{+}{N}(CH_3)_2CH_2OHOH^-$) group-containing mixed copolymer which reduces buffer, $Mg^{++}$, $Cu^{++}$ and $Zn^{++}$ ion concentration to less than $10^{-7}$ M.

A column 1.45 × 45 inches is half filled with demineralized water from which all air bubbles have been removed. A slurry of the resin in air-free demineralized water is poured gently into the column and allowed to settle. The column is then back-washed several times with demineralized water to constant pH (ca. 7.0) and ionic strength (conductance about 1.0 mho) of the effluent. The final bed height is 33 inches, giving a bed volume of 58.3 cubic inches (957 milliliters) and total exchange capacity of 440 milliequivalents, based on a factor of 0.46 given by the manufacturer for this resin.

The fractions from the gel filtration step containing the orgotein protein are combined and concentrated, if necessary, to a protein content of 8–10 percent. This solution is carefully loaded onto the top of the column and thereafter developed with demineralized water. The flow rate is adjusted to about 20 milliliters per minute and the appearance of the protein in the eluate is followed by ultraviolet absorption ($A_{280}$). The eluate is collected in 25 milliliter fractions. The orgotein protein generally appears in the fourth to twelfth fractions. Buffer-$Me^{++}$ concentration drops well below $10^{-7}$ M, as indicated by a drop of conductivity from 4,000 to 5,000 mho before column filtration to 1.5–2.5 mho thereafter.

For the preparation of a sterile orgotein solution for injection purposes, fructose, sucrose or other saccharide is added to the resulting buffer solution to a concentration of at least 2 parts saccharide per part protein. The solution is then sterilized by ultra-filtration and filtered into pre-sterilized ampules or vials under sterile conditions. The resulting product can then be lyophilized to produce a more stable product.

Following the above-described process, 75 kg of fresh beef liver (22.5 kg dry weight), yields about 25–40 grams (0.12–0.17 percent) of final precipitate from the $(NH_4)_2SO_4$ step and 7 to 9 grams of the final, fully purified orgotein protein, equivalent to an over-all yield of 0.032–0.041 percent calculated on the dry weight of the liver, a 300 or more percent increase in yield over that obtained by the process described in Ser. No. 576,454.

EXAMPLE 2

The procedure of Example 1 is followed, except the filtration step is conducted at room temperature using a buffer solution containing from 5–10 percent sucrose. In similar variations, one or more of each of Steps (a), (b), (d) and (e) of Preparation 1 are also conducted at room temperature.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a solution of orgotein having a metal and buffer ion content of the solution of less than $10^{-7}$ M concentration from a buffer solution of orgotein containing greater than $10^{-7}$ M concentration of a divalent metal having an ionic radius from 0.65 to 0.79 A, said orgotein being a metalloprotein characterized physically by being the isolated, substantially pure form of a globular, buffer and water-soluble protein having a highly compact native conformation which, although heat labile, is stable to heating for several minutes at 65° C. when dissolved in a buffer solution containing a salt of a divalent metal having an ionic radius of 0.60 to 1.00 A and which on gel electrophoresis gives a characteristic multiple-band pattern; chemically, by containing all or all but one of the essential aminoacids, a small percentage of carbohydrate, no lipids, 0.1 to 1.0 percent metal content provided by one to 4 gram atoms per mole of one or more chelated divalent metals having an ionic radius of 0.60 to 1.00 A, and substantially no chelated monovalent metals or cell poisons in the molecule; pharmacodynamically, by being a non-toxic, substantially non-antigenic injectable protein whose pharmacological activity includes anti-inflammatory activity which, like its compact conformation, is related to its chelated divalent metal content; and immunologically, by being a member of a family of protein congeners whose immunological relatedness is sufficient to enable its antibodies prepared in the rabbit or other suitable animal to recognize as an antigen one or more other congeners or for one or more of the antibodies to another congener to recognize it as an antigen, as evidenced in gel immunoelectrophoresis or gel immunodiffusion, which comprises reducing the ion content to less than $10^{-7}$ M by passing the buffer solution of orgotein having an ion content greater than $10^{-7}$ M through an ion exchange resin bed consisting of a single ion exchange resin having both acidic and basic groups which are in sufficiently close proximity so that the resin is partially neutralized internally yet sufficiently separated spatially so that the resin has absorptive attraction for both anions and cations.

2. A process according to claim 1 wherein the resin is a styrene-divinyl, benzene gel-type resin containing —$SO_3H$ and —$N(CH_3)_2(CH_2OH)OH$ groups as ion-adsorptive groups.

3. A process according to claim 1 wherein the resin has a particle size of over 325 mesh.

4. A process according to claim 2 wherein the resin has a particle size of over 325 mesh and the ratio of resin to protein is at least 10:1.

5. A process according to claim 1 wherein the starting buffer solution contains a mixture of $Mg^{++}$, $Cu^{++}$ and $Zn^{++}$ ions as substantially the sole divalent metal ions in the buffer solution.

6. A process according to claim 4 wherein the starting buffer solution contains a mixture of $Mg^{++}$, $Cu^{++}$ and $Zn^{++}$ ions as substantially the sole divalent metal ions in the buffer solution.

7. A process according to claim 5 wherein the $Mg^{++}$, $Cu^{++}$ and $Zn^{++}$ ions are present in the starting buffer solution at concentrations of about $10^{-3}$ M, $10^{-4}$ M and $10^{-5}$ M, respectively.

8. A process according to claim 1 wherein the starting buffer solution is an eluate fraction obtained by filtration of a buffer solution containing a mixture of the orgotein protein and undesired proteins through a porous gel which acts as a molecular sieve.

9. A process according to claim 8 wherein the buffer solution has a pH of about 7.8 and contains about $10^{-3}$ M $Mg^{++}$, about $10^{-4}$ M $Cu^{++}$ and about $10^{-5}$ M $Zn^{++}$ ions.

10. A process according to claim 8 wherein the orgotein protein of the starting mixture of the orgotein protein and undesired proteins is a metal chelate wherein the metals thereof consist essentially of one or more divalent metals having an ionic radius from 0.65 to 0.79 A.

11. A process according to claim 10 wherein the metals of the divalent metal consist essentially of one or more of $Mg^{++}$, $Cu^{++}$ and $Zn^{++}$.

12. A process according to claim 10 wherein the metal chelate of the starting mixture is obtained by transchelating the orgotein protein as a mixture with undesired proteins wherein the predominate metal of the metal chelate is $Mn^{++}$ by dissolving the mixture of proteins in a buffer solution containing dissolved therein at a concentration greater than $10^{-7}$ M of a slat of a divalent metal having an ionic radius from 0.65 to 0.79 A.

13. A process according to claim 12 wherein the buffer solution contains dissolved therein at a concentration greater than $10^{-7}$ M of a mixture of $Mg^{++}$, $Cu^{++}$ and $Zn^{++}$ ions.

14. A process according to claim 13 wherein the $Mg^{++}$, $Cu^{++}$ and $Zn^{++}$ ions are present in the buffer solution at concentrations of about $10^{-3}$, $10^{-4}$ and $10^{-5}$, respectively.

* * * * *